US010926646B2

United States Patent
Yoshizawa

(10) Patent No.: US 10,926,646 B2
(45) Date of Patent: Feb. 23, 2021

(54) VEHICLE CONTROL SYSTEM AND VEHICLE CONTROL METHOD

(71) Applicant: SUBARU CORPORATION, Tokyo (JP)

(72) Inventor: Satoshi Yoshizawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 257 days.

(21) Appl. No.: 16/039,008

(22) Filed: Jul. 18, 2018

(65) Prior Publication Data

US 2019/0092187 A1 Mar. 28, 2019

(30) Foreign Application Priority Data

Sep. 25, 2017 (JP) .............................. JP2017-183815

(51) Int. Cl.
*B60L 15/20* (2006.01)
*B60W 10/08* (2006.01)

(52) U.S. Cl.
CPC ......... *B60L 15/2009* (2013.01); *B60W 10/08* (2013.01); *B60L 2240/423* (2013.01)

(58) Field of Classification Search
CPC .. B60L 15/2009; B60L 2240/423; B60L 7/10; B60L 7/12; B60L 7/14; B60L 7/20; B60L 7/24
See application file for complete search history.

(56) References Cited

U.S. PATENT DOCUMENTS

| 2005/0264102 A1 | 12/2005 | Tezuka |
| 2014/0300175 A1 | 10/2014 | Takahashi |
| 2017/0166063 A1* | 6/2017 | Cho ...................... B60T 13/586 |
| 2018/0099580 A1* | 4/2018 | Kumazaki ......... B60W 50/0098 |

FOREIGN PATENT DOCUMENTS

| JP | 2005-335647 A | 12/2005 |
| JP | 2013-095183 A | 5/2013 |
| JP | 2017-005899 A | 1/2017 |

OTHER PUBLICATIONS

Japanese Office Action issued in corresponding Japanese Patent Application No. 2017-183815, dated Feb. 12, 2019, with English Translation.

* cited by examiner

*Primary Examiner* — Melanie Torres Williams
(74) *Attorney, Agent, or Firm* — McDermott Will & Emery LLP

(57) ABSTRACT

A vehicle control system includes a detector, a motor generator, a regenerative braking force estimator, and a regenerative brake controller. The detector detects a longitudinal force applied to an axle and a torque applied to the axle. The motor generator brakes the axle by a regenerative brake. The regenerative braking force estimator estimates a braking force caused by the regenerative brake by subtracting a force corresponding to the torque from the longitudinal force. The regenerative brake controller controls the regenerative brake caused by the motor generator on a basis of the estimated braking force.

8 Claims, 3 Drawing Sheets

VEHICLE CONTROL SYSTEM AND VEHICLE CONTROL METHOD

CROSS-REFERENCE TO RELATED APPLICATIONS

The present application claims priority from Japanese Patent Application No. 2017-183815 filed on Sep. 25, 2017, the entire contents of which are hereby incorporated by reference.

BACKGROUND

1. Technical Field

The present invention relates to a vehicle control system and a vehicle control method.

2. Related Art

Japanese Unexamined Patent Application Publication (JP-A) No. 2005-335647, for instance, describes a technology assuming directly detecting force that acts on a wheel and performing cooperative control of friction braking and regenerative braking.

SUMMARY OF THE INVENTION

An aspect of the present invention provides a vehicle control system including: a detector configured to detect a longitudinal force applied to an axle and a torque applied to the axle; a motor generator configured to brake the axle by a regenerative brake; a regenerative braking force estimator configured to estimate a braking force caused by the regenerative brake by subtracting a force corresponding to the torque from the longitudinal force; and a regenerative brake controller configured to control the regenerative brake caused by the motor generator on a basis of the estimated braking force.

An aspect of the present invention provides a vehicle control method including: detecting a longitudinal force applied to an axle and a torque applied to the axle; braking the axle by a regenerative brake; estimating a braking force caused by the regenerative brake by subtracting a force corresponding to the torque from the longitudinal force; and controlling the regenerative brake on a basis of the estimated braking force.

An aspect of the present invention provides a vehicle control system including: a detector configured to detect a longitudinal force applied to an axle and a torque applied to the axle; a motor generator configured to brake the axle by a regenerative brake; and circuitry configured to estimate a braking force caused by the regenerative brake by subtracting a force corresponding to the torque from the longitudinal force, and control the regenerative brake caused by the motor generator on a basis of the estimated braking force.

DETAILED DESCRIPTION

Figure 1:
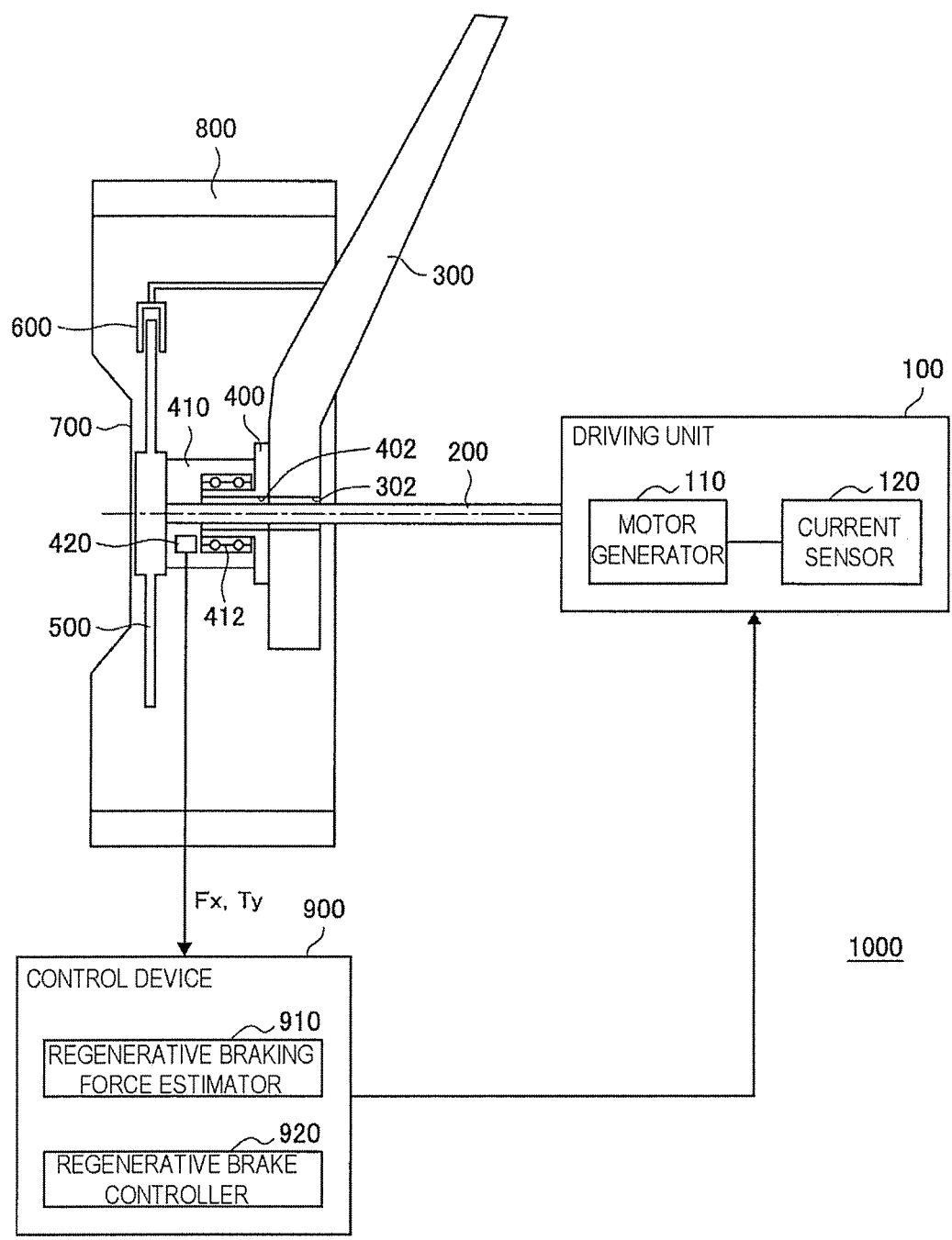
FIG. 1 is a schematic diagram illustrating a configuration of a vehicle control system according to an example of the present invention.

Hereinafter, preferred examples of the present invention will be described in detail with reference to the appended drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following examples which are not recited in a most-generic independent claim of the present invention are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

In the case of performing regenerative braking described in JP-A No. 2005-335647, in order to control regenerative braking force, a control parameter (a current value or a voltage value) of a motor generator is controlled while the control parameter is monitored. However, in the case where there is a malfunction in a sensor that detects a control parameter, the control parameter cannot be controlled, which makes it difficult to control regenerative braking force.

It is desirable to provide a novel and improved vehicle control system and vehicle control method that are capable of controlling regenerative braking force reliably even in the case where a control parameter of a motor generator cannot be acquired.

FIG. 1 is a schematic diagram illustrating a configuration of a vehicle control system 1000 according to an example of the present invention. As illustrated in FIG. 1, the vehicle control system 1000 includes a driving unit 100, a drive shaft 200, an upright 300, a hub 400 on the body side, a hub 410 on the tire side, a bearing 412, a brake disc 500, a brake caliper 600, a wheel 700, a tire 800, and a control device 900. In FIG. 1, structural elements other than the control device 900 are illustrated in a state of being viewed from the front of the vehicle.

The driving unit 100 includes a motor generator 110. Driving force of the motor generator 110 is transferred to the tire 800 via the drive shaft 200. In addition, driving force that propagates from a road surface to the tire 800 propagates from the tire 800 to the motor generator 110 as regenerative driving force. Note that the driving unit 100 may include, in addition to the motor generator 110, a reducer that decelerates rotation of the motor generator 110 and transfers the rotation to the drive shaft 200.

In FIG. 1, the hub 400 on the body side is fixed to the upright 300. The hub 410 on the tire side is rotatable with respect to the hub 400 on the body side via the bearing 412. The brake disc 500 is fixed with respect to the hub 410 on the tire side. The wheel 700 is fixed with respect to the hub 410 on the tire side or the brake disc 500. The tire 800 is fitted to the rim of the wheel 700.

The drive shaft 200 penetrates a hole 302 provided in the upright 300 and additionally penetrates a hole 402 of the hub 400 to be coupled to the hub 410. A gap is provided between the drive shaft 200 and the hole 302 of the upright 300, and a gap is provided also between the drive shaft 200 and the hole 402 of the hub 400. Therefore, rotation of the drive shaft 200 is transferred to the hub 410 without interfering with the upright 300 or the hub 400.

The brake caliper 600 is fixed to a fixed member on the vehicle body side, such as the upright 300. The brake caliper 600 brakes the brake disc 500 in response to operation of a brake pedal by a driver of the vehicle. Thus, the vehicle is braked by a friction brake.

The hub 410 is provided with a detector 420. The detector 420 detects force that acts on the tire 800. Force detected by the detector 420 includes components of force in three directions including longitudinal force Fx, lateral force Fy, and vertical force Fz, and torque Ty around an axis of the hub (axle) 410. The longitudinal force Fx is a component of force generated in a direction (x axis) parallel to a wheel mid-plane, of friction force generated on a ground contact area of the tire 800. The lateral force Fy is a component of force generated in a direction (y axis) perpendicular to the wheel mid-plane. The vertical force Fz is force that acts in a vertical direction (z axis), what is called vertical load. The torque Ty is torque (torsional force) around an axle of the tire 800.

For instance, the detector 420 mainly includes a strain gauge, and a signal processing circuit that processes an electrical signal output from this strain gauge and generates a detection signal corresponding to force. On the basis of a knowledge that stress caused in the hub 410 is proportional to force, force is directly detected by embedding the strain gauge in the hub 410. Note that a specific configuration of the detector 420 is disclosed in JP-A No. H04-331336 and JP-A No. H10-318862, for instance; see these if needed. The detector 420 may be provided in the drive shaft 200.

In the vehicle control system 1000 configured as described above, when the driver of the vehicle presses the brake pedal, the brake caliper 600 brakes the brake disc 500 as described above. In addition, when the driver of the vehicle presses the brake pedal, driving force that propagates from a road surface to the tire 800 is transferred to the motor generator 110, and the vehicle is braked by a regenerative brake (regenerative braking) caused by the motor generator 110.

Figure 2:
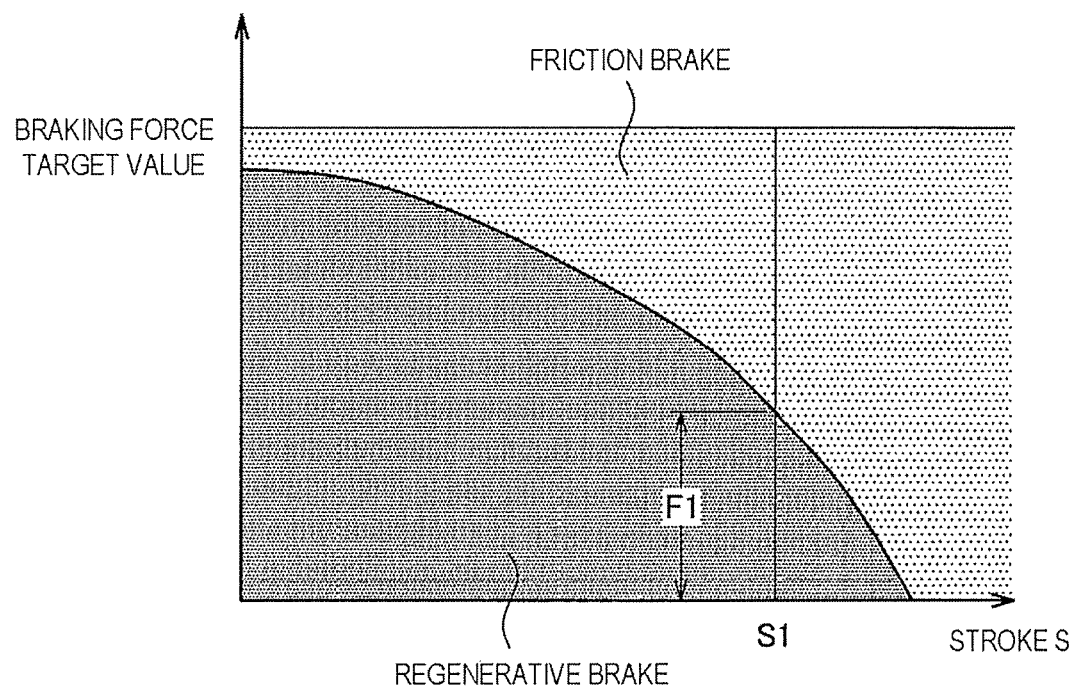
FIG. 2 is a schematic diagram illustrating an example of a map for deciding a proportion of braking force of a friction brake to braking force of a regenerative brake, in braking of the vehicle.
Figure 3:
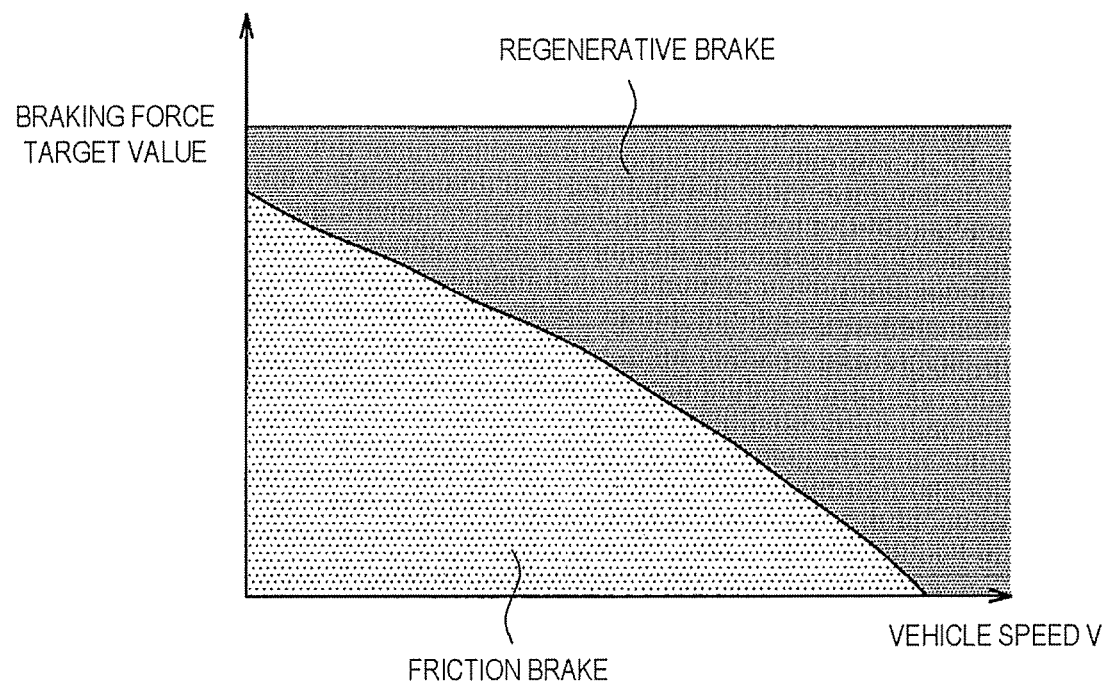
FIG. 3 is a schematic diagram illustrating an example of a map for deciding a proportion of braking force of a friction brake to braking force of a regenerative brake, in braking of the vehicle.

In this manner, in braking of the vehicle, the friction brake and the regenerative brake are used in combination for braking. At this time, a proportion (ratio) of braking force of the friction brake to braking force of the regenerative brake is decided in accordance with a driving state (vehicle speed) of the vehicle, a stroke when the brake pedal is pressed, or the like. FIGS. 2 and 3 are schematic diagrams each illustrating an example of a map for deciding the proportion of the braking force of the friction brake to the braking force of the regenerative brake in braking of the vehicle.

FIG. 2 is a schematic diagram illustrating an example of a map defining the relationship between a proportion of braking force of the friction brake to braking force of the regenerative brake, and a stroke when the brake pedal is pressed. In FIG. 2, the horizontal axis indicates a stroke S when the brake pedal is pressed. In addition, the vertical axis indicates a total value (braking force target value) of braking force of the friction brake and braking force of the regenerative brake. As illustrated in FIG. 2, a larger stroke S makes the ratio of the braking force of the friction brake larger and the ratio of the braking force of the regenerative brake smaller. Note that the braking force target value may change in accordance with the stroke S.

FIG. 3 is a schematic diagram illustrating an example of a map defining the relationship between a proportion of braking force of the friction brake to braking force of the regenerative brake, and a vehicle speed V. In FIG. 3, the horizontal axis indicates the vehicle speed V. In addition, the vertical axis indicates a total value (braking force target value) of braking force of the friction brake and braking force of the regenerative brake, as in FIG. 2. As illustrated in FIG. 3, a higher vehicle speed V makes the ratio of the braking force of the regenerative brake larger and the ratio of the braking force of the friction brake smaller.

As described above, the proportion of the braking force of the friction brake to the braking force of the regenerative brake is finally decided by a multidimensional map including a plurality of maps as illustrated in FIGS. 2 and 3.

For convenience of description, assuming that the proportion of the braking force of the friction brake to the braking force of the regenerative brake is determined from the map illustrated in FIG. 2, the braking force of the regenerative brake is F1 illustrated in FIG. 2 in the case where the stroke is S1 illustrated in FIG. 2. The control device 900 controls the motor generator 110 in a manner that the braking force of the regenerative brake is F1. At this time, the control device 900 monitors a current value of the motor generator 110 by a current sensor 120, and controls the motor generator 110 in a manner that the current value is a value corresponding to the braking force F1. In other words, a current value I of the motor generator corresponding to the braking force F1 is set in advance, and the control device 900 uses the current value I as a command value to control the regenerative brake of the motor generator 110 in a manner that a current value detected by the current sensor 120 is the command value I. Note that the control device 900 may use a voltage value of the motor generator 110 corresponding to the braking force F1 as a command value to control the regenerative brake of the motor generator 110 in a manner that a voltage value of the motor generator 110 detected by a voltage sensor is the command value. In this manner, the control device 900 uses a control parameter (a current value or a voltage value) of the motor generator 110 corresponding to the braking force F1 as a command value to control the regenerative brake of the motor generator 110 in a manner that a value of a control parameter of the motor generator 110 detected by a sensor is the command value.

However, a malfunction in the current sensor 120 that detects the current of the motor generator 110 makes it difficult to control the motor generator 110 on the basis of the command value I. More specifically, in an electric vehicle caused to travel by the motor generator 110, the motor generator 110 is controlled on the basis of a command value (a current value or a voltage value) from an inverter provided together with the motor generator 110, and the inverter receives feedback of a current value of the motor generator 110 and feedback-controls the motor generator. However, if there is a malfunction in the current sensor 120 that detects the current value of the motor generator 110, generated torque cannot be computed, so that the motor generator 110 cannot be controlled properly.

Therefore, in the present example, regenerative braking force caused by the regenerative brake of the motor generator 110 is estimated on the basis of a detection value of the detector 420. Then, on the basis of the estimated regenerative braking force, the motor generator 110 is controlled in a manner that regenerative braking force caused by the motor generator 110 is a target value (the braking force F1 illustrated in FIG. 2). Thus, the control device 900 includes a regenerative braking force estimator 910 and a regenerative brake controller 920. Note that structural elements of the control device 900 illustrated in FIG. 1 can include a circuit (hardware), or a central processor such as a CPU and a program (software) for making it function.

The regenerative braking force estimator 910 estimates regenerative braking force caused by the regenerative brake of the motor generator 110. The regenerative braking force estimator 910 estimates regenerative braking force P on the basis of the longitudinal force Fx and the torque Ty around the axle of the tire 800, which are detected by the detector 420.

A specific method for estimating the regenerative braking force P is as follows. First, in a state in which the vehicle is decelerated, that is, a state in which driving force caused by the driving unit 100 is not transferred to the tire 800, the detector 420 detects the longitudinal force Fx. The longitudinal force Fx detected here is the sum total of braking force caused by the friction brake and braking force caused by the regenerative brake. Hence, the following equation (1) holds.

regenerative braking force $P$+friction brake braking force=longitudinal force $Fx$    (1)

In the equation (1), the longitudinal force Fx on the right side is detected by the detector 420. Hence, the regenerative braking force P can be found if the friction brake braking force on the left side is obtained. Here, friction brake braking force is force corresponding to the torque Ty (tire rotation torque) applied to the axle, and thus can be found from the torque Ty detected by the detector 420. Specifically, the friction brake braking force is found from the following equation (2).

friction brake braking force=torque $Ty$/tire radius    (2)

Hence, the regenerative braking force P can be found from the following equation (3) by substituting the equation (2) into the equation (1).

regenerative braking force $P$=longitudinal force $Fx$−torque $Ty$/tire radius    (3)

Here, in a state in which the driver of the vehicle has not pressed the brake pedal and the vehicle travels by inertia, the tire 800 is spun by movement on a road surface. In this state, no strain occurs in the hub 410, so that the torque Ty is not detected by the detector 420.

Meanwhile, in the case where the driver presses the brake pedal to generate braking force caused by the friction brake, strain occurs in the hub 410 because the brake caliper 600 is fixed to a fixed object on the vehicle side, such as the upright 300, as illustrated in FIG. 1. Therefore, in a state in which braking force caused by the friction brake is generated, strain occurs in the hub 410, and the torque Ty corresponding to the strain is detected by the detector 420. Hence, the torque Ty detected by the detector 420 is a value corresponding to the braking force of the friction brake, and the friction brake braking force can be found by converting the torque Ty to force on the basis of the equation (2).

As described above, the longitudinal force Fx is the sum total of the friction brake braking force and the regenerative braking force P caused by the regenerative brake; hence, if the friction brake braking force is found, the regenerative braking force P can be found from the equation (1).

As described above, the regenerative braking force estimator 910 can estimate the regenerative braking force P on the basis of the longitudinal force Fx and the torque Ty detected by the detector 420.

The regenerative brake controller 920 controls regenerative braking force caused by the motor generator 110 on the basis of the estimated regenerative braking force P. In the case of controlling regenerative braking force on the basis of the map in FIG. 2 described above, the target value (the braking force F1) of the control by the regenerative brake is determined in accordance with the stroke S of pressing the brake pedal. The regenerative brake controller 920 controls the motor generator 110 in a manner that the regenerative braking force P estimated from the detection value of the detector 420 is the braking force F1, which is the target value. The regenerative brake controller 920 can control the motor generator 110 via the inverter provided together with the motor generator 110. Note that the estimation of the regenerative braking force P by the regenerative braking force estimator 910 may be performed in a state in which there is no malfunction in the current sensor 120. According to the present example, the regenerative brake can be controlled on the basis of the estimated regenerative braking force, regardless of whether there is a malfunction in the current sensor 120.

Figure 4:
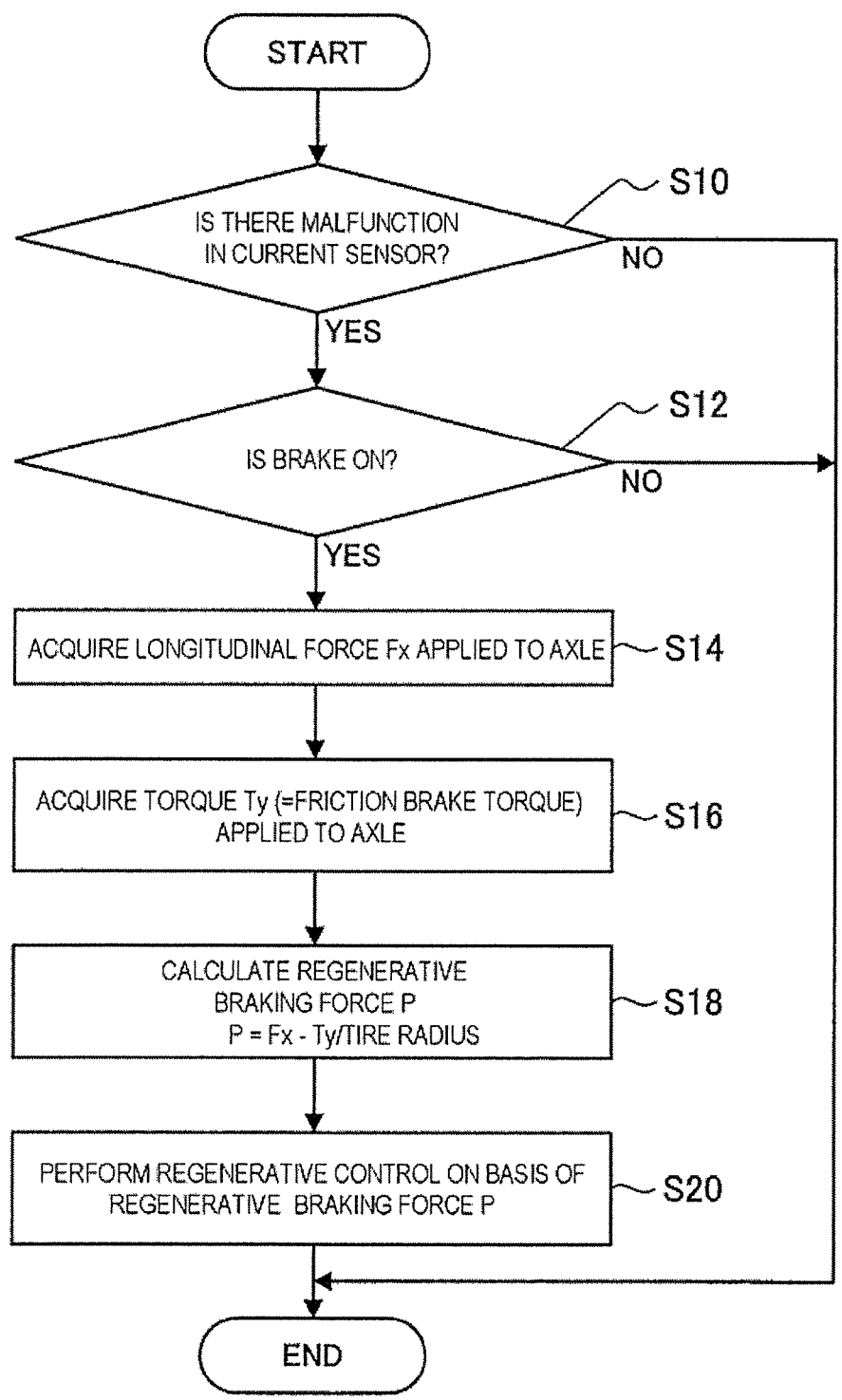
FIG. 4 is a flowchart illustrating processing performed in a control device.

Next, processing performed in the control device 900 is described on the basis of a flowchart in FIG. 4. First, in step S10, it is determined whether there is a malfunction in the current sensor 120, and in the case where there is a malfunction in the current sensor 120, the processing goes to step S12. Meanwhile, in the case where there is no malfunction in the current sensor, the processing ends (END).

In step S12, it is determined whether a brake is on, that is, whether the brake pedal is pressed. Then, in the case where the brake pedal is pressed, the processing goes to step S14. Meanwhile, in the case where the brake pedal is not pressed, the processing ends (END). Whether the brake pedal is pressed can be determined by a brake sensor or the like provided in the brake pedal. If the brake pedal is pressed, braking is performed by using the friction brake and the regenerative brake in combination on the basis of the maps in FIGS. 2 and 3.

In step S14, the longitudinal force Fx applied to the axle is acquired from the detector 420. In next step S16, the torque Ty applied to the axle is acquired. In next step S18, the regenerative braking force P is calculated on the basis of the equation (3).

In step S20, regenerative braking force of the motor generator 110 is controlled on the basis of the regenerative braking force P. The processing ends (END) after step S20.

As described above, according to the present example, the regenerative braking force P can be estimated on the basis of the longitudinal force Fx and the torque Ty applied to the axle, which are detected by the detector 420. Therefore, even in the case where a control parameter (a current value or a voltage value) of the motor generator 110 cannot be acquired, the regenerative brake can be controlled on the basis of the regenerative braking force P.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle control system comprising:
a detector configured to detect a longitudinal force applied to an axle and a torque applied to the axle;

a motor generator configured to brake the axle by a regenerative brake;

a regenerative braking force estimator configured to estimate a braking force caused by the regenerative brake by subtracting an amount of the torque applied to the axle from an amount of the longitudinal force applied to the axle;

a regenerative brake controller configured to control the regenerative brake caused by the motor generator on a basis of the estimated braking force; and a sensor configured to detect a driving parameter of the motor generator, wherein the regenerative braking force estimator estimates the braking force when there is a malfunction in the sensor.

2. The vehicle control system according to claim 1, further comprising a friction brake configured to brake the axle by a friction force, wherein the regenerative braking force estimator estimates the braking force when the friction brake is operated.

3. The vehicle control system according to claim 2, wherein the torque corresponds to a braking torque caused by the friction brake when the friction brake is operated.

4. The vehicle control system according to claim 1, wherein the force corresponding to the torque is a value obtained by dividing the torque by a tire radius.

5. The vehicle control system according to claim 2, wherein the force corresponding to the torque is a value obtained by dividing the torque by a tire radius.

6. The vehicle control system according to claim 3, wherein the force corresponding to the torque is a value obtained by dividing the torque by a tire radius.

7. A vehicle control method comprising:

detecting a longitudinal force applied to an axle and a torque applied to the axle;

braking, by a motor generator, the axle by a regenerative brake;

detecting, by a sensor, a driving parameter of the motor generator;

estimating a braking force caused by the regenerative brake by subtracting an amount of the torque applied to the axle from an amount of the longitudinal force applied to the axle when there is a malfunction in the sensor; and controlling the regenerative brake on a basis of the estimated braking force.

8. A vehicle control system comprising:

a detector configured to detect a longitudinal force applied to an axle and a torque applied to the axle;

a motor generator configured to brake the axle by a regenerative brake;

a sensor configured to detect a driving parameter of the motor generator; and circuitry configured to estimate a braking force caused by the regenerative brake by subtracting amount of the torque applied to the axle from an amount of the longitudinal force applied to the axle when there is a malfunction in the sensor, and control the regenerative brake caused by the motor generator on a basis of the estimated braking force.

* * * * *